United States Patent
Zhang et al.

(10) Patent No.: US 9,467,744 B2
(45) Date of Patent: Oct. 11, 2016

(54) COMMENT-BASED MEDIA CLASSIFICATION

(71) Applicant: Verizon and Redbox Digital Entertainment Services, LLC, Basking Ridge, NJ (US)

(72) Inventors: Gong Zhang, Waltham, MA (US); Jian Huang, Sudbury, MA (US); Jianxiu Hao, Acton, MA (US); Gaurav D. Mehta, Brookline, MA (US)

(73) Assignee: Verizon and Redbox Digital Entertainment Services, LLC, Basking Ridge, NJ (US)

(*) Notice: Subject to any disclaimer, the term of this patent is extended or adjusted under 35 U.S.C. 154(b) by 249 days.

(21) Appl. No.: 14/143,967

(22) Filed: Dec. 30, 2013

(65) Prior Publication Data

US 2015/0186368 A1    Jul. 2, 2015

(51) Int. Cl.
 *G06F 17/30* (2006.01)
 *H04N 21/475* (2011.01)
 *H04N 21/25* (2011.01)

(52) U.S. Cl.
 CPC ...... *H04N 21/4756* (2013.01); *G06F 17/3082* (2013.01); *H04N 21/252* (2013.01)

(58) Field of Classification Search
 None
 See application file for complete search history.

(56) References Cited

U.S. PATENT DOCUMENTS

| 8,516,374 B2* | 8/2013 | Fleischman | G06Q 30/02 715/716 |
| 9,129,008 B1* | 9/2015 | Kuznetsov | G06F 17/30616 |
| 2007/0115256 A1* | 5/2007 | Lee | G09G 5/14 345/156 |
| 2008/0109391 A1* | 5/2008 | Chan | G06N 5/00 706/45 |
| 2008/0189733 A1* | 8/2008 | Apostolopoulos | H04N 7/17318 725/28 |
| 2014/0365207 A1* | 12/2014 | Convertino | G06F 17/2785 704/9 |

FOREIGN PATENT DOCUMENTS

JP        2008278088 A  * 11/2008

OTHER PUBLICATIONS

Pang, Opinion Mining and Sentiment Analysis, 2008, pp. 1-94.*

* cited by examiner

*Primary Examiner* — Albert Phillips, III

(57) ABSTRACT

A system and method relate to identifying comments associated with digital content and submitted by one or more users. The comments are parsed to determine terms included in the comments. The respective classifications associated with the comments are determined based on the terms, and at least one classification of the digital content may be identified based on the respective classifications associated with the comments. In one implementation, the classification of the digital content is determined based on identifying comments associated with a portion of the digital content, and identifying a particular classification associated with at least a threshold number of the comments associated with the portion.

20 Claims, 10 Drawing Sheets

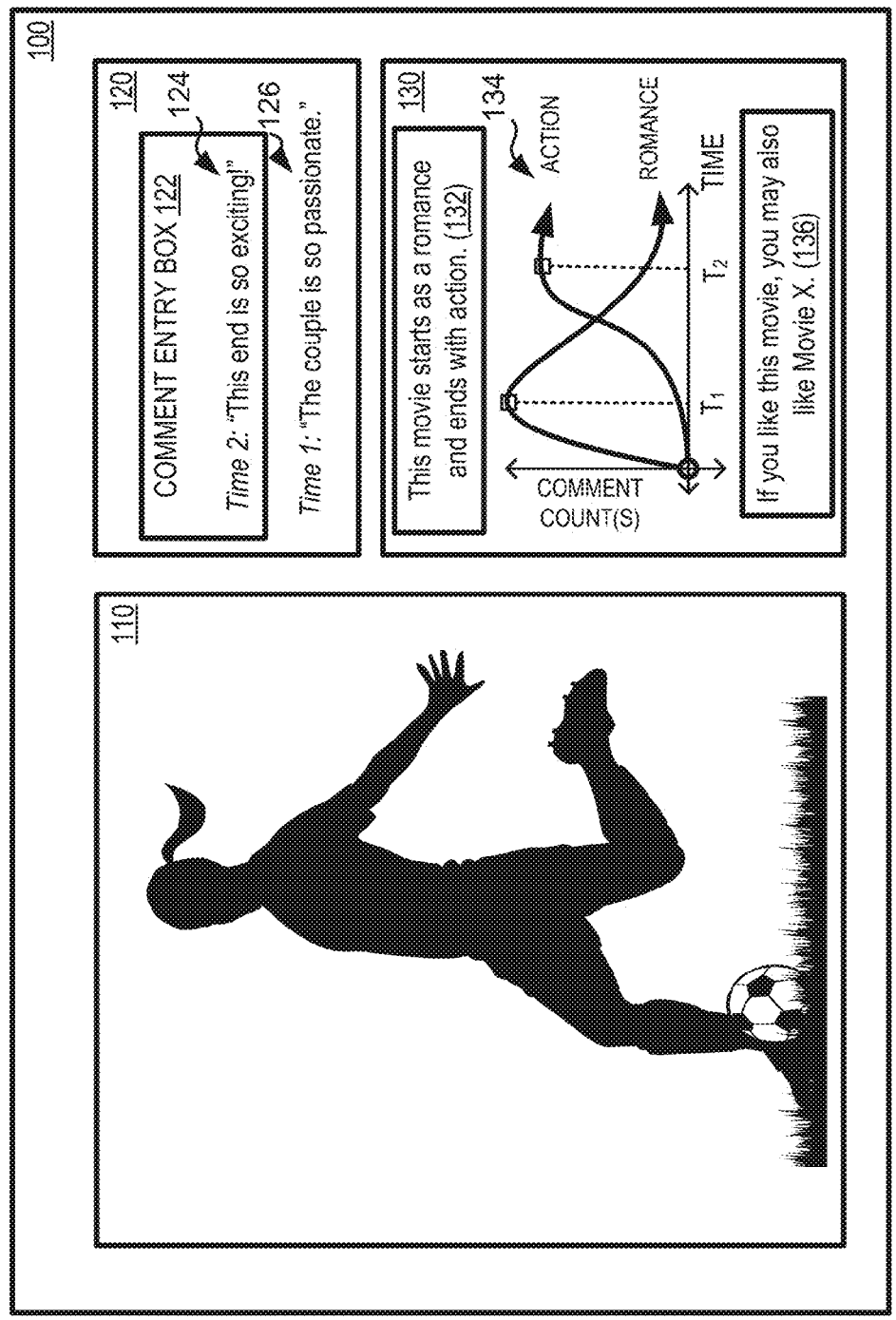

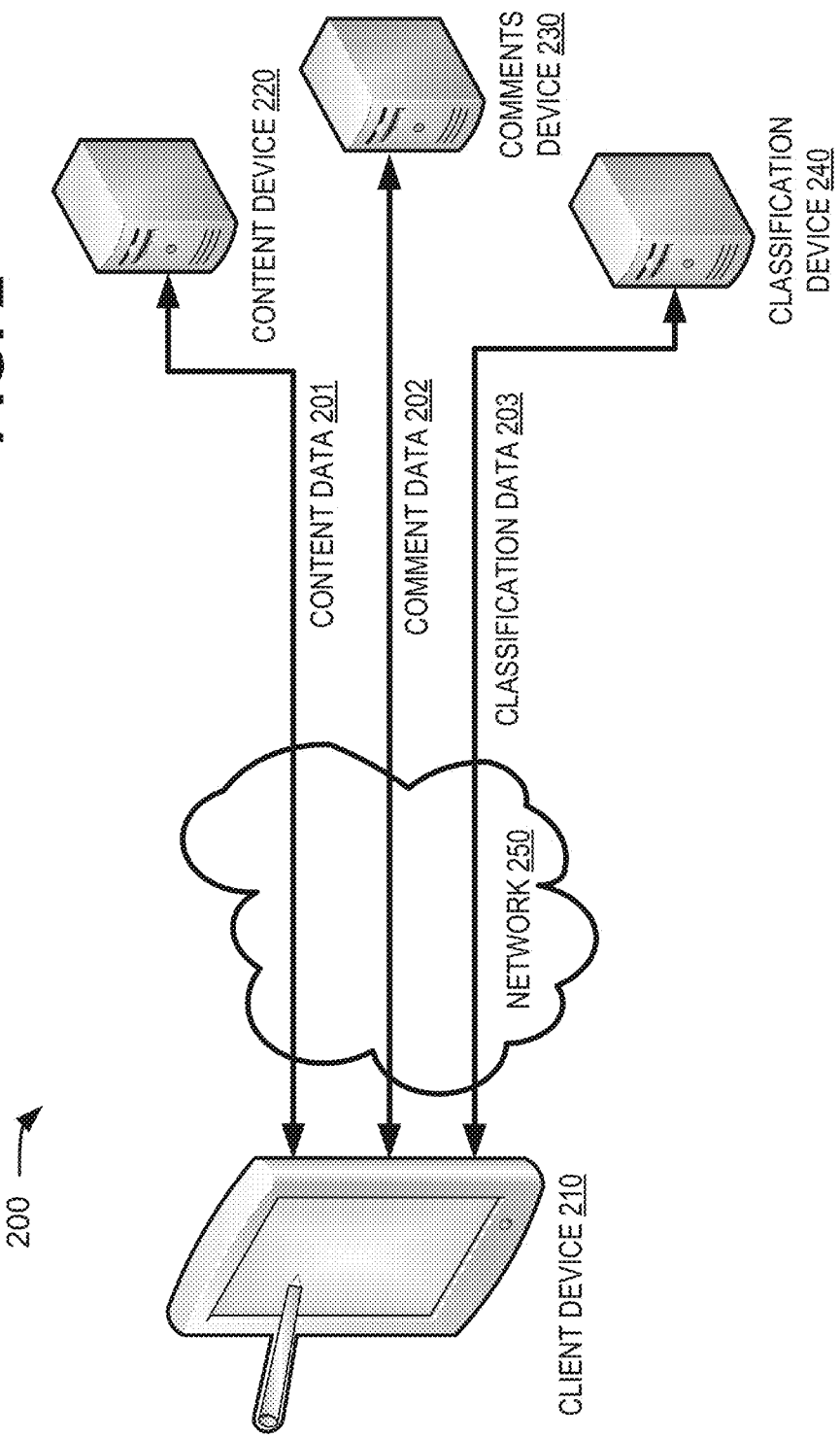

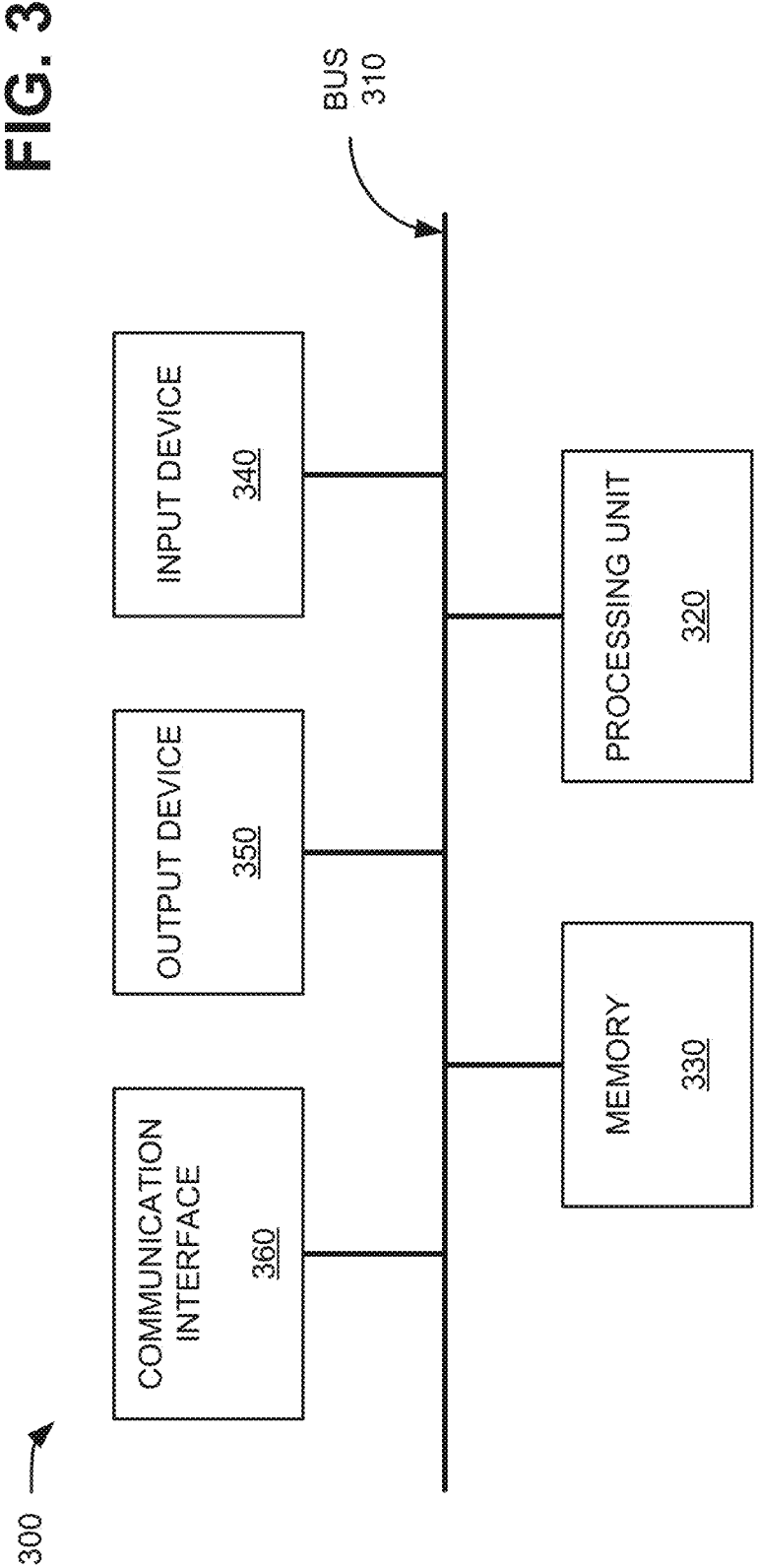

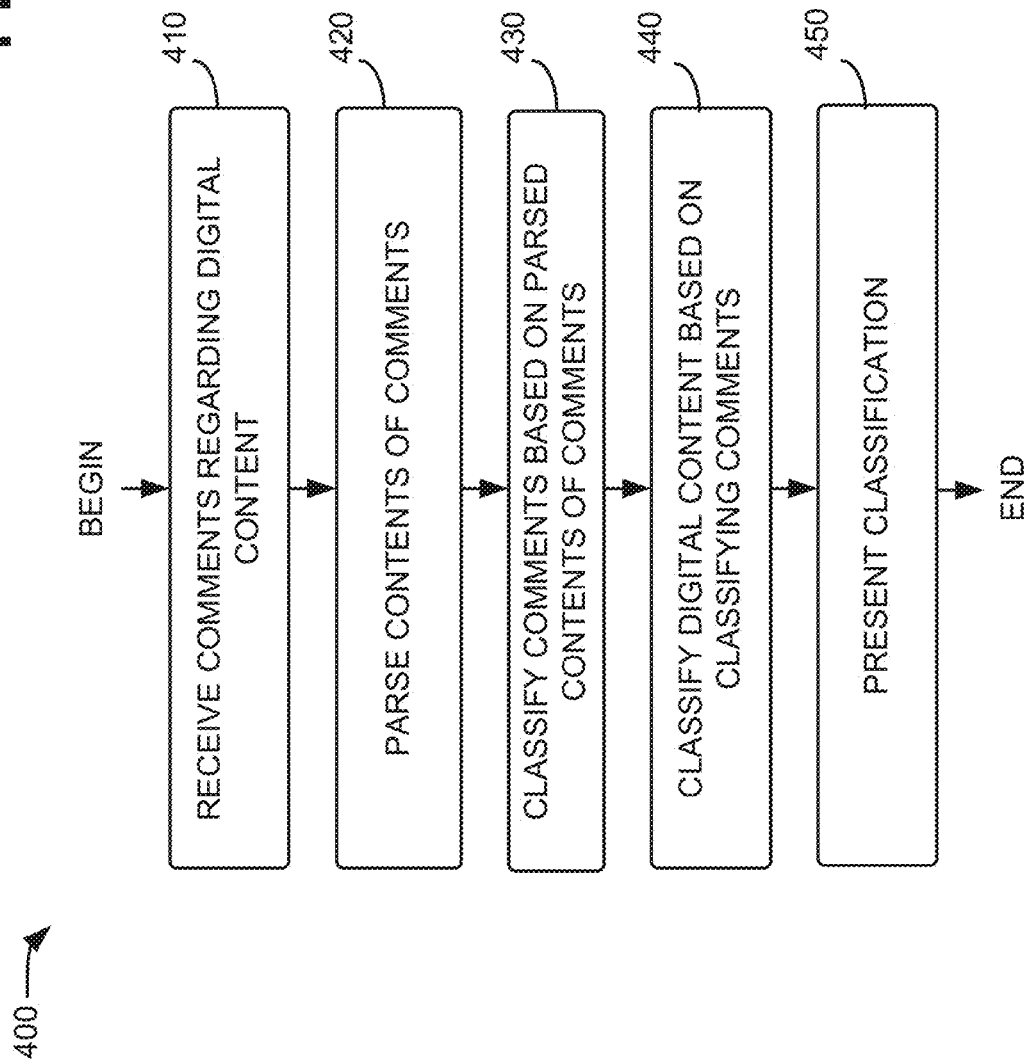

FIG. 7

| COMMENT (710) | TIME (720) | USER (730) | DIGITAL CONTENT (740) |
|---|---|---|---|
| I LOVE THIS KISS | $TIME_1$ | $USER_1$ | $MOVIE_1$ |
| THIS PART IS SO EXCITING | $TIME_2$ | $USER_2$ | $MOVIE_2$ |
| ... | ... | ... | ... |

| TERMS (810) | CLASSIFICATION (820) |
|---|---|
| AWESOME | HORROR, ACTION |
| KISS | ROMANCE |
| DULL | BORING |
| ... | ... |

| TIME PERIOD 910 | TOTAL COUNTS 920 | COMEDY COUNTS 930 | BORING COUNTS 940 | SAD COUNTS 950 | ACTION COUNTS 960 |
|---|---|---|---|---|---|
| 1 | 2 | 2 | 0 | 0 | 0 |
| 2 | 3 | 3 | 0 | 0 | 0 |
| 3 | 4 | 4 | 0 | 0 | 0 |
| 4 | 5 | 5 | 0 | 0 | 0 |
| 5 | 6 | 6 | 0 | 0 | 0 |
| 6 | 8 | 8 | 3 | 0 | 0 |
| 7 | 5 | 5 | 1 | 0 | 0 |
| 8 | 4 | 2 | 2 | 0 | 0 |
| 9 | 5 | 0 | 5 | 0 | 0 |
| 10 | 6 | 0 | 6 | 0 | 0 |
| 11 | 10 | 0 | 10 | 0 | 0 |
| 12 | 11 | 0 | 11 | 0 | 0 |
| 13 | 9 | 0 | 9 | 0 | 0 |
| 14 | 25 | 0 | 5 | 0 | 20 |
| 15 | 26 | 0 | 3 | 0 | 23 |
| 16 | 25 | 0 | 0 | 0 | 25 |
| 17 | 11 | 0 | 0 | 0 | 11 |
| 18 | 0 | 0 | 0 | 0 | 0 |
| 19 | 3 | 0 | 0 | 3 | 0 |
| 20 | 5 | 0 | 0 | 5 | 0 |
| 21 | 11 | 0 | 0 | 11 | 0 |
| 22 | 20 | 0 | 0 | 20 | 0 |
| 23 | 11 | 0 | 0 | 11 | 0 |
| 24 | 6 | 0 | 0 | 6 | 0 |
| 25 | 3 | 0 | 0 | 3 | 0 |
| 26 | 2 | 0 | 0 | 2 | 0 |
| 27 | 0 | 0 | 0 | 0 | 0 |
| 28 | 0 | 0 | 0 | 0 | 0 |
| 29 | 1 | 0 | 1 | 0 | 0 |
| 30 | 0 | 0 | 0 | 0 | 0 |
| 31 | 0 | 0 | 0 | 0 | 0 |
| 32 | 0 | 0 | 0 | 0 | 0 |

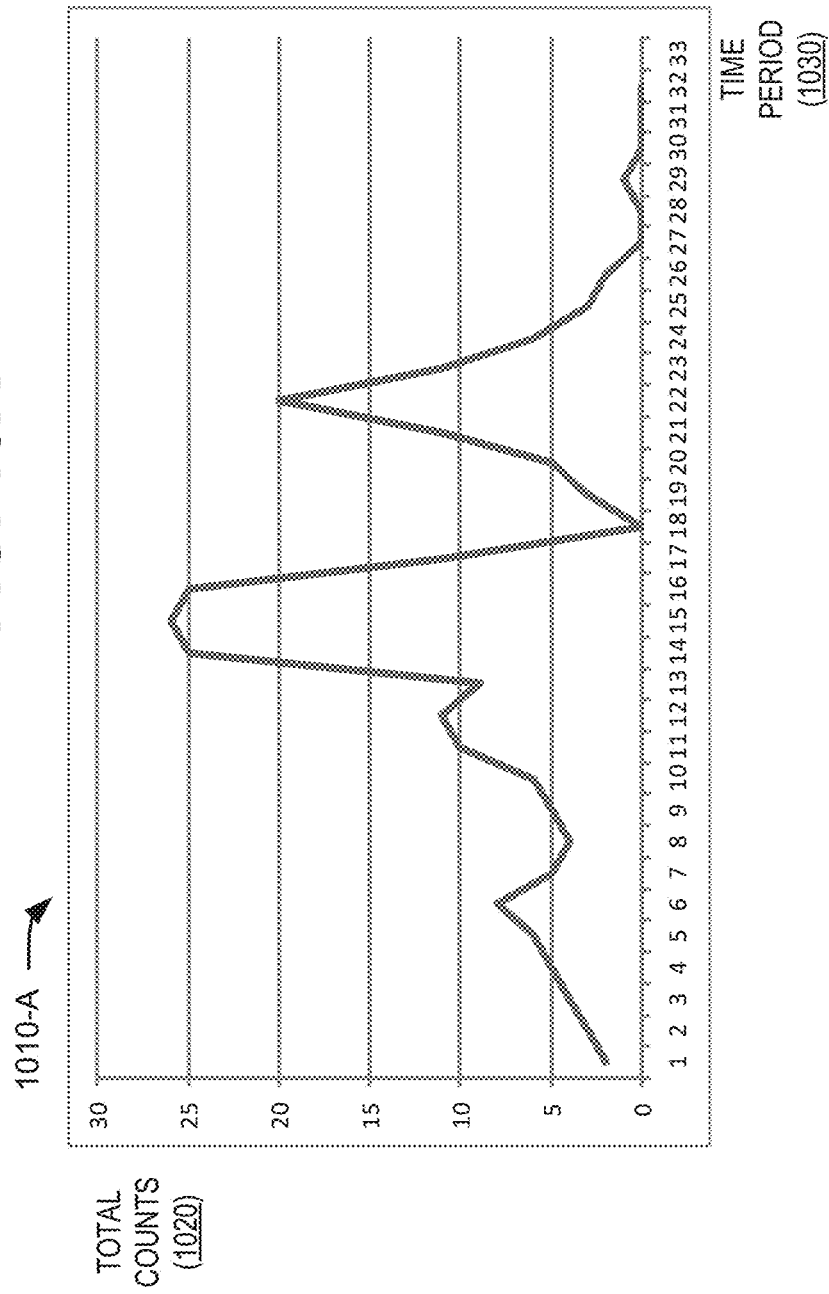

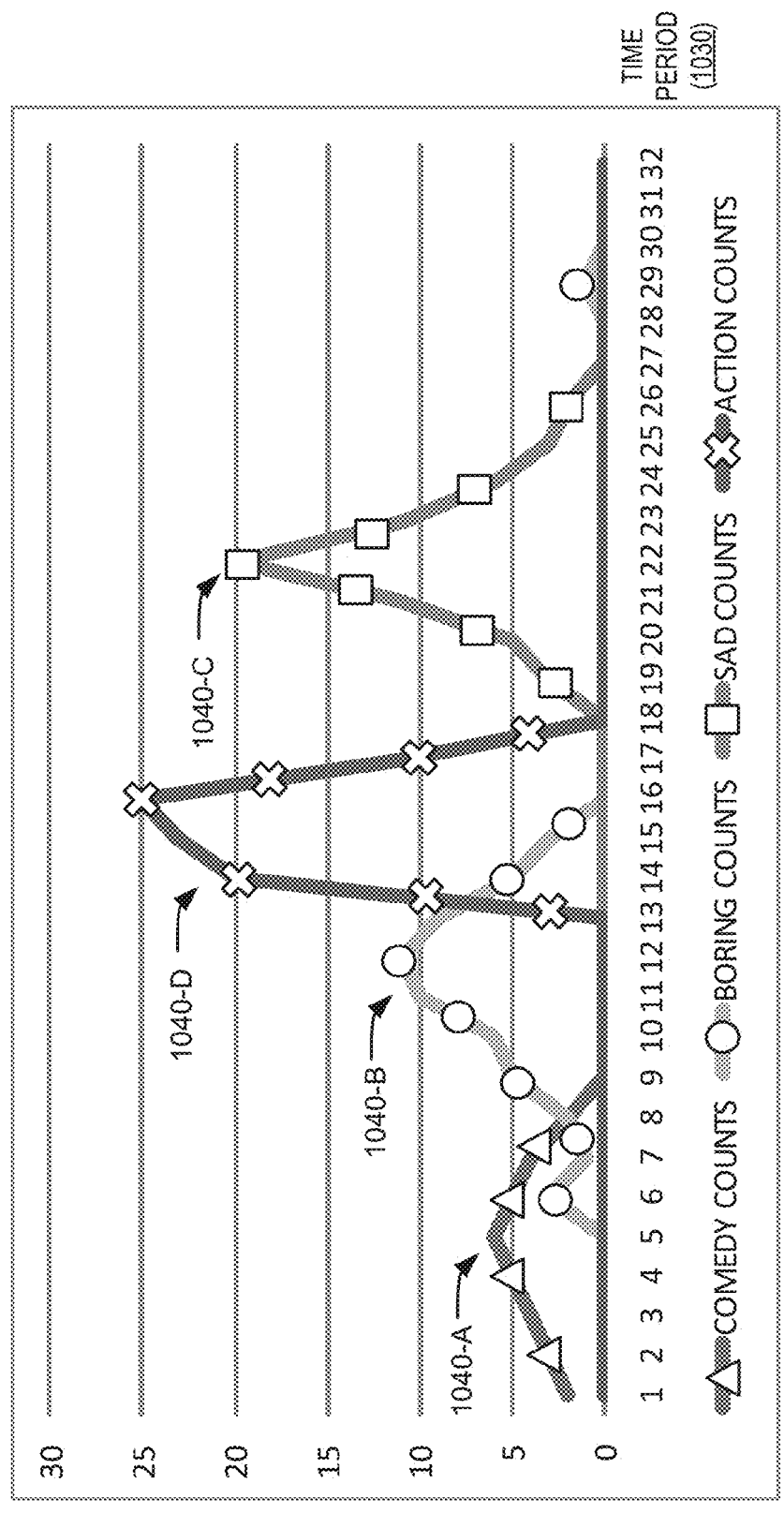

COMMENT-BASED MEDIA CLASSIFICATION

BACKGROUND

Digital content may be assigned to classifications. For example, the classification associated with a digital content may be used to identify an intended audience, and the digital content may be marketed to the intended audience based on the assigned classification. The digital content may also be clustered with other digital contents associated with the assigned classification. For example, the digital content may be identified within a listing of the contents in the assigned classification.

BRIEF DESCRIPTION OF THE DRAWINGS

FIG. 1 shows an exemplary interface to receive a comment regarding a digital content and to present a classification of the digital content based on the comment;

FIG. 2 shows a schematic diagram of an exemplary system for presenting the interface of FIG. 1;

FIG. 3 shows a diagram of exemplary components of a device that may correspond to a component of the system of FIG. 2;

FIG. 4 shows a flow diagram of an exemplary process for classifying digital content based on user comments;

FIG. 7 shows an exemplary table that stores information regarding comments and information associated with the comments;

FIG. 8 shows an exemplary table that stores information identifying terms and one or more classifications associated with the terms;

FIG. 9 shows a exemplary table storing a quantity comments of different classifications received for different time periods (or portions) associated with digital content;

FIG. 10A shows a graph representing total quantity of comments received during the different time periods in the example of table in FIG. 9; and FIG. 10B shows a graph representing respective quantities of comments received in different classifications during the different time periods in the example of table in FIG. 9.

DETAILED DESCRIPTION OF PREFERRED EMBODIMENTS

Figure 6:
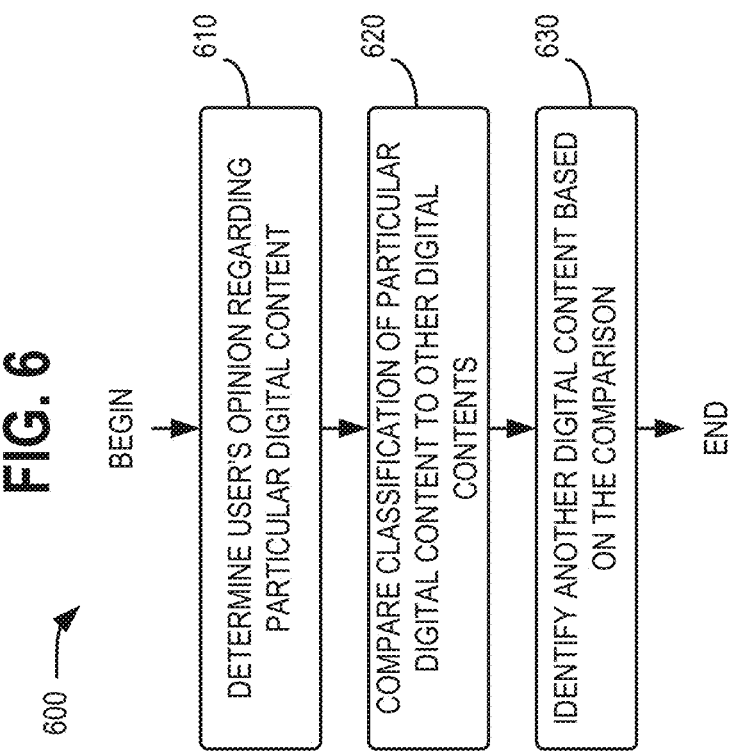
FIG. 6 shows a flow diagram of an exemplary process for recommending digital content to a user based on classifying other digital content.

The following detailed description refers to the accompanying drawings. The same reference numbers in different drawings may identify the same or similar elements.

In accordance with an implementation described herein, comments associated with digital content may be received from one or more users. For example, an interface may be provided so that a user are may submit comments while accessing the digital content and/or the comments may be collected from a website related to the digital content, such as from a social media website. The comments are parsed to determine terms included in the comments, and the respective classifications associated with the comments may be determined based on the terms. A classification of the digital content may be identified based on the respective classifications associated with the comments. In one implementation, the classification of the digital content may be determined based on identifying a subset of the comments associated with a portion of the digital content, and identify a particular classification, of the classifications, associated with at least a threshold number of the subset of the comments, and the classification of the portion may correspond to the particular classification.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device. "Digital content," as referred to herein, includes one or more units of digital content that may be provided to a customer. The unit of digital content may include, for example, a segment of text, a defined set of graphics, a uniform resource locator (URL), a script, a program, an application or other unit of software, a media file (e.g., a movie, television content, music, etc.), a document, or an interconnected sequence of files (e.g., hypertext transfer protocol (HTTP) live streaming (HLS) media files).

FIG. 1 shows an exemplary interface 100 provided to a user to receive a comment from the user and to provide classification information based on the comment. As shown in FIG. 1, interface 100 may include, for example, a display region 110, a comment region 120, and a classification region 130.

Interface 100 is generally provided for the benefit of a user of a client device via a client application program, process, or interface that is executed at the client device for enabling data communications with one or more other devices via a network. For example, interface 100 may be implemented on a client device executing a client application program to access a functionality of a web application. Interface 100 may be provided to the user of the client device through, for example, a web browser application executable at the client device. Alternatively, interface 100 may be a dedicated application program that is installed and executable at the client device to enable the user to access relevant web application functionality.

Display region 110 may receive data associated with digital content (e.g., the digital content are downloaded or streamed to interface 100) and may process the data to present a visual representation associated with the digital content. For example, display region 110 may present an image or a series of images (e.g., pages of a book or a movie) associated with the digital content. An associated audio representation, such as spoken dialog and/or music, may also be presented in connection with the visual representation presented in display region 110.

Comment region 120 may display a comment received from the user, and the comment may relate to the digital content presented in display region 110. For example, comment region 120 may include a comment entry box 122 through which the user may submit a comment 124. Comment region 120 may display, for example, data related to another comment 126 received from the user (e.g., a comment previously received via comment entry box 122) or from another user (e.g., a user associated with another client device) in connection with the digital content presented in display region 110. For example, comments 124 and 126 may be exchanged between users during the presentation of the digital content or may be received after the presentation of the digital content.

Comments 124 and 126 may include text expressing an opinion related to the digital content presented in display region 110 (e.g., whether a commenter liked or disliked a portion the digital content). In the example show in FIG. 1, comment 124 ("This end is so exciting!") received at Time 2 (e.g., via comment entry box 122) indicates an opinion of the user associated with interface 100 with respect to a corresponding portion of the digital content (e.g., a portion presented in display region 110 at Time 2). Continuing with the example of FIG. 1, comment 126 ("This couple is so passionate") indicates an opinion of the user (or another user) with respect to another portion of the digital content (e.g., a portion presented in display region 110 at Time 1).

As described in greater detail below, the comments may be monitored (e.g., counted) in order to identify noteworthy portions of the digital content (e.g., portions receiving at least a threshold quantity of comments). In another implementation, the contents of comment 124 may be processed to determine the user's opinion regarding the portion of the digital content.

Comment 124 and 126 may be associated with a particular portion of the digital content. In the example shown in FIG. 1, comment 124 may be associated with a portion of the digital content being presented via display region 110 at Time 2, and comment 126 may be associated with a portion of the digital content being presented via display region 110 at time 1.

In another implementation, a comment 124/126 may be processed to determine a relevant portion of the digital content based on contents of the comment 124/126. In the example shown in FIG. 1, the contents of comment 124 ("The end is so exciting.") may be associated with an "end" of the digital content, even if comment 124 is received while a different portion of the digital content is being presented via display region 110.

Although comments 124 and 126 are shown in FIG. 1 as textual phrases, in another implementation, comments 124 and/or 126 may be received in a non-textual form. For example, comment region 120 may include a graphical interface to receive feedback regarding a portion of the digital content. For example, comment region 120 may present a menu identifying different classifications (e.g., genres) of digital content and the user may click on or otherwise select from one or more of the classifications with respect to the digital content.

Continuing with FIG. 1, classification region 130 may present a classification 132 to the user. Classification 132 may be generated based on comments 124 and 126 and other comments (not displayed) received from other users and/or other information associated with the digital content. The classification 132 may identify one or more classifications (e.g., genres and/or descriptors) associated with the digital content. In the example shown in FIG. 1, exemplary classification 132 indicates that "This movie starts as a romance and ends with action." As described in greater detail below, classification 132 may be generated based on processing comments 124 and 126 to identify, for example, terms included in comments 124 and 126 that are associated with the one or more classifications.

In the example shown in FIG. 1, an initial portion of the digital content (e.g., a portion associated with Time 1, or $T_1$) may be classified as "romance" based on the contents of comment 126. For example, the terms "couple" and "passionate" included in comment 126 may be interpreted to suggest that the user found a corresponding portion of the digital content to be related to the "romance" classification. Continuing with the example presented in FIG. 1, an end portion of the digital content (e.g., a portion associated with Time 2, or $T_2$) is classified as "action" based on the contents of comment 124. For example, the term "exciting" included in comment 126 may be interpreted to suggest that the user found a corresponding portion of the digital content to be related to the "action" classification.

Continuing with interface 100 in FIG. 1, classification region 130 may further include, for example, a graphical classification 134 that shows the number (or counts) of comments in each classification received at different times (e.g., different portions of the digital content). As demonstrated in graphical classification 134, different users may have different opinions regarding how to classify a portion of the digital content, and their comments may reflect these different opinions. For example, exemplary graphical classification 134 shows that the portion of the digital content associated with $T_1$ received some "action" comments, but this section is classified as "romance" since a relatively larger number of "romance" comments were received for this portion of the digital content. Similarly, exemplary graphical classification 134 shows that the portion of the digital content associated with $T_2$ received some "romance" comments, but this section is classified as "action" since a relatively larger number of "action" comments were received for this portion of the digital content.

In another implementation, classification region 130 may also present a recommendation 136. Recommendation 136 may be based on the classification of the digital content provided in display region 110 and/or the subject of a comment in comment region 120. Recommendation 136 may identify another digital content that corresponds to classification 132. In the example depicted in FIG. 1, recommendation 136 states that "If you [the user] like this movie, you may also like Movie X." For example, recommendation 136 may identify another digital content that "starts as a romance and ends with action," as stated in classification 132. In one implementation, recommendation 136 may be further generated based on other information, such as comments 124 by the user, demographic information related to the user, prior purchase/viewing history of the user, etc.

Although FIG. 1 shows exemplary aspects of interface 100, in other implementations, interface 100 may present less data, different data, differently arranged data, or additional data than depicted in FIG. 1. As an example, display region 110 may be presented on a first device (e.g., on a display device such as television), and comment region 120 and classification region 130 may be presented in a separate device (e.g., on a smart phone, remote control, tablet, laptop computer, etc.).

In another implementation, comment region 120 and classification region 130 may be combined such that classification 132 may be presented proximate to a corresponding comment 124 or 126. For example, a separate classification 132 may be presented in connection with each of comments 124 and 126.

In another implementation, interface 100 may include additional region(s). For example, interface 100 may include another region that presents information related to the digital content, the user, and/or the client device. For example, interface 100 may include a region presenting metadata (e.g., a title, people associated with the digital content (writers, actors, singers, etc.), awards, and ratings, etc.) associated with the digital content.

FIG. 2 shows a schematic diagram of an exemplary system 200 for presenting interface 100 of FIG. 1 in one implementation. As shown in FIG. 2, system 200 may include a client device 210 that presents interface 100 shown in FIG. 1. In connection with presenting interface 100, client device 210 may exchange, for example, content data 201 with content device 220, comment data 202 with comments device 230, and classification data 203 with classification device 240 via network 250 when presenting interface 100.

Client device 210 may include a device that is capable of communicating over network 250. Client device 210 may include, for example, a telephone, a wireless device, a smart phone, a tablet, a personal digital assistant (PDA), a laptop computer, a global positioning system (GPS) or mapping device, a gaming device, a music playing device, or other types of computation or communication devices. Client device 210 may also include a set-top box (STB), a connected television, a laptop computer, a tablet computer, a personal computer, a game console, or other types of computation and/or communication devices. In one implementation, client device 210 may include a client application that allows a user to interact with content device 220 to order and/or receive broadcast content and special-order (e.g., video-on-demand (VOD), pay-per-view event, etc.) content. In some implementations, client device 210 may also include a client application to allow video content to be presented on an associated display.

Client device 210 and content device 220 may exchange content data 201 via network 250. Content data 201 may include, for example, the digital content to be displayed by client device 210 (e.g., in display region 110). Content data 201 may also include a listing of digital content available from content device 220 and/or pricing information regarding the available digital content. Content data 210 may also include a request from client device 210 for the digital content, such as a selection based on classification 132. In one implementation, content data 201 may also include data or a program related to accessing digital content through content device 220. For example, content data 201 may identify an encoding scheme (e.g., a codec) used for the digital content and/or may include a program for handling the encoding scheme.

In one implementation, content data 201 may be modified based on classification data 203. For example, content data 201 may include advertisement data that is selected based on the classification of the digital content. In addition or alternatively, the advertisements may be selectively presented during portions of the digital content based on the classification data 203. In the example presented in graphical classification 134 of FIG. 1, certain advertisements may be selected to be shown during the beginning portion (e.g., associated with T1) based on this portion of the digital content being classified in the "romance" classification, and certain advertisements may be selected to be shown during the end portion (e.g., associated with $T_2$) based on this portion of the digital content being classified in the "action" classification.

Continuing with system 200 in FIG. 2, Client device 210 and comments device 230 may exchange comment data 202 via network 250. Comment data 202 may include, for example, data associated with comments 124 and 126 received by client device 210 from an associated user. For example, comment data 202 may include contents (e.g., associated text) of the comments 124 and 126, and metadata associated with the comments, such as a time when the comments are submitted, data identifying person and/or device associated with the comments, etc. Comment data 202 may further include, for example, data associated with comments 126 received from other client devices (e.g., from other users). Client device 210 may present comments region 120 based on the comment data 202. Comments device 230 may forward the comments 124 and 126 to other client devices.

In one implementation, comments device 230 may be obtained in connection with a "chat room" in which different users interact with respect to a specific topic. In another implementation, comments device 230 may operate in connection with social media. For example, comments 124 and/or 126 may be collected from Internet forums, a user's blogs, social networks, podcasts, picture-sharing, wall-posting, music-sharing, etc. Thus, comments 124 and 126 may be received even when digital content is not be presented.

Classification device 240 may receive comment data 202 and classify digital content based on the comment data 202. For example, as described above with respect to classification region 130 in FIG. 1, classification device 240 may review comments 124 and 126 to determine a classification of particular portion of a digital content. For example, classification device 240 may identify comments 124 and 126 that are received during playback of a portion of digital content and/or reference the portion of the digital contents and form classification data 203 regarding the portion.

Network 250 may include any network or combination of networks. In one implementation, network 250 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Alternatively or in addition, network 250 may include a contents delivery network having multiple nodes that exchange data with client device 210. Although shown as a single element in FIG. 2, network 250 may include a number of separate networks that function to provide communications and/or services to client device 210.

In one implementation, network 250 may include a closed distribution network. The closed distribution network may include, for example, cable, optical fiber, satellite, or virtual private networks that restrict unauthorized alteration of contents delivered by a service provider. For example, network 250 may also include a network that distributes or makes available services, such as, for example, television services, mobile telephone services, and/or Internet services. Network 250 may be a satellite-based network and/or a terrestrial-based network. In implementations described herein, network 250 may support television services for a customer associated with client device 210.

Although FIG. 2 shows exemplary components of system 200, in other implementations, system 200 may include fewer components, different components, differently arranged components, or additional components than depicted in FIG. 2. As an example, system 200 may include one or more intermediate devices, such as a router, firewall, etc. (not depicted), that connect client device 210 to network 250. System 200 may also include, for example, an application server that relate to providing social media between two or more client devices 210.

Furthermore, although a single client device 210 is shown in FIG. 2, system 200 may include several client devices 210. For example, system 200 may include multiple client devices 210 and classification device 240 may then generate classification data 203 associated with different client devices 210 based on comments 124 and 126. For example, classification data 203 may be sent to one set of client devices 210 based on comments received from another set of client devices 210. In another implementation, different classification data 203 may be sent to different client devices. For example, classification data 203 corresponding to comments 124 and 126 associated with a particular user may be sent only to a client device 210 associate with the particular user.

Furthermore, it should be appreciated that tasks described as being performed by two or more other components of device system may be performed by a single component, and tasks described as being performed by a single component of system 200 may be performed by two or more components. For example, in a one implementation, comments device 230 and classification device 240 may be included in a single, composite device.

FIG. 3 is a diagram of exemplary components of a device 300 that may correspond, for example, to a component of system 200 (e.g., client device 210, content device 220, comment device 230, or classification device 240). For example, a component of system 200 may be implemented and/or installed as software, hardware, or a combination of hardware and software in device 300. In one implementation, device 300 may be configured as a network device. In another implementation, device 300 may be configured as a computing device. As shown in FIG. 3, device 300 may include, for example, a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), and/or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. Communication interface 360 may include a wired and/or wireless, such as a radio frequency (RF) mechanism to communicate with the other devices and/or systems. For example, communication interface 360 may include mechanisms for communicating with other devices, such as other devices of system 200.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, a display may not be included in device 300. In these situations, device 300 may be a "headless" device that does not include an input device.

FIG. 4 is a flow diagram of an exemplary process 400 for classifying digital content based on user comments. In one implementation, process 400 may be performed by classification device 240. In other implementations, process 400 may be performed using classification device 240 and one or more other devices.

Process 400 may include receiving comments from a user regarding digital content (block 410). For example, as described above with respect to FIGS. 1 and 2, comments 124 and 126 may be received via interface 100 in one or more client devices 210 and forwarded to classification device 240. In another implementation, the comments may be obtained, for example, via Internet forums, a user's blogs, social networks, podcasts, picture-sharing, wall-posting, music-sharing, etc. For example, a user's public comments received on a social media web site may be collected.

FIG. 7 shows an exemplary comments table 700 that may be stored and/or generated by classification device 240 in one implementation. Referring to FIG. 7, comment table 700 may include, for example, comments field 710, time field 720, user field 730, and digital content field 740. Comment field 710 may store information associated with comments 124 and 126. For example, comment field 710 may store the contents or a portion (e.g., key words or terms) of the comments 124 and 126 (e.g., text included in comments 124 and 126).

Time field 720 may store information identifying a time associated with the comments. For example, time field 720 may store information identifying when the comments 124 and 126 were submitted and/or received via interface 100. In addition or alternatively, time field 720 may store information identifying one or more portions of digital contents associated with the comments 124 and 126. For example, time field 720 may store information identifying a portion of the digital content references in a comment 124.

Continuing with FIG. 7, comments table 700 may further include user field 730 that stores information identifying, for example, particular client devices 210 associated with comments 124 and 126 (e.g., a client device 210 that provided interface 100 to receive a comment 124) and/or users associated with the particular client devices 210. Comments table 700 may also include digital contents field 740 that stores data identifying digital contents associated with comments 124 and 126 (e.g., a digital content being presented in display region 110 when comment 124 is received).

In the example shown in FIG. 7, comment table 700 stores comments field 710 for the comment "I love this kiss" and stores information associating this comment with $Time_1$ in time field 720, $User_1$ in user field 730, and $Movie_1$ in digital content field 740. Continuing with in FIG. 7, comment table 700 stores comments field 710 for the comment "This part is so exciting" and stores information associating this comment with $Time_2$ in time field 720, $User_2$ in user field 730, and $Movie_2$ in digital content field 740.

Returning to process 400 in FIG. 4, classification device 240 may parse the contents of the comments (block 420) and may classify the digital content based on the parsed contents (block 430). For example, classification device 240 may identify whether comments 124 and 126 include terms that are associated with (e.g., identify and/or describe) one or more classifications, and may classify the comments 124 and 126 based on the presence of the terms within the comments.

If the user's comments associated with digital content include terms associated with multiple classifications, classification device 240 may classify the digital content based on, for example, respective number of terms associated with each classification. For example, classification device 240 may determine that users associate the digital content with a particular classification when the comments 124 and 126 include more terms associated with the particular classification than terms associated with other classifications. In the example of graphical classification 134 in FIG. 1, the beginning portion of the digital content (i.e., associated with $T_1$) received some "action" comments, but this portion is classified as "romance" since a relatively larger number of "romance" comments were received for the beginning portion.

FIG. 8 shows an exemplary terms table 800 that may be stored and/or generated by classification device 240 in one implementation. Terms table 800 may include, for example, term field 810 and classification field 820. Terms field 810 may store information identifying terms that may be included in one or more comments 124 and 126. For example, term field 810 may store text strings identifying terms, such as keywords that are descriptive or the categories. In the example shown in FIG. 8, terms field 810 include the terms "awesome, "kiss" and "dull."

Continuing with terms table 800 in FIG. 8, classification field 820 may store information associating terms identified in terms field 810 with one or more categories. In the example shown in terms table 800 of FIG. 8, the term "awesome" in terms field 810 is associated with classifications field 820 values or classifications of "horror" and "action"; the term "kiss" in terms field 810 is associated with a classifications field 820 value of "romance"; and the term "dull" in terms field 810 is associated with a classifications field 820 value of "boring". Thus, classification field 820 may include information identifying, as a classification, a genre and/or a descriptor associated with the digital content.

The values stored in terms field 810 and in classification field 820 may be manually collected (e.g., via input received through interface 100 or otherwise received from client device 210). In another implementation, the values stored in classification field 820 may be automatically identified. For example, comments 124 and 126 associated with a particular document classification may be analyzed to determine terms that frequently appear in comments associated with that particular classification.

In one implementation, the classification identified in classification field 820 may be dynamically defined in real time based on text included the comments. For example, a word or phrases included in a threshold number of comments associated with a digital content or a portion of the digital content may be selected as a category. In this way, new classifications may be added based on the received comments.

Continuing with process 400 in FIG. 4, classification device 240 may classify digital content based on the classifications of the comments (block 440). For example, classification device 240 may identify a number of comments (a "classification count") that include terms associated with a particular classification and may determine whether to associate the particular classification with digital content based on the classification count. For example, classification device 240 may associate the particular classification with the digital content if the classification count exceeds a threshold value. If the classification counts for multiple classifications exceed the threshold value, classification device 240 may associate the digital content with the multiple classifications. Classification device 240 may also associate the particular classification with the digital content if the classification count associated with the particular classification exceeds classification counts associated with other classifications.

Classification device 240 may determine the threshold value based on a user input (e.g., via interface 100). In another implementation, the threshold value may represent a fraction of total comments received regarding the digital content. For example, classification device 240 may associate the digital content with a classification if at least a half (or other fraction) of the comments for the digital content are associated with the classification.

In one implementation, classification device 240 may weigh certain comments more than other comments. For example, classification device 240 may increase the weight of (e.g., assign a larger classification count to) a comment that includes multiple terms associated with a classification. In another implementation, certain terms may have a stronger association with a classification than other terms, and classification device 240 may weigh comments that include the certain terms.

In another implementation, classification device 240 may identify comments associated with different users (e.g., identify user who composed the comments), and may classify a digital content based on classifying the digital contents with respect to the different users. For example, classification device 240 may determine a particular user's classification of the digital content based on the particular user's comments. For example, classification device 240 may associate a user with the particular classification if at least a half (or other fraction) of the comments for the digital content by the user are associated with the particular classification. In one implementation, classification device 240 may weigh certain the comments associated with certain users more than other users. For example, classification device 240 may increase the weight of comments assigned to "trusted" users, such as professional reviewers, users approved by other users, etc.

Classification device 240 may further identify the classification of digital content in block 440 based on other information. For example, classification device 240 may determine a classification of digital content based on metadata associated with the digital content, such as the terms included in an identifier (or title) of digital content. Classification device 240 may determine a classification of digital content based on the classification of another digital content (e.g., a digital content by the writer associated with the digital content). Classification device 240 may also determine a classification of a digital content based on a classification assigned to the digital content by a content provider or vendor, etc. For example, if a content provider assigns a classification to digital content, the digital content may be associated with the assigned classification unless more than a threshold number and/or percentage of comments are associated with a different classification.

While a user's preferences with respect to particular digital content are generally discussed as being extracted from textual comments 124 and 126, it should be appreciated that a classification may also be determined based on other types of comments 124 and 126. For example, interface 100 may provide a graphical interface to receive feedback regarding a portion of the digital content. For example, comment region 120 may present a graphical menu identifying different classifications (e.g., genres) and may allow a user to click on or otherwise select from one of the classifications from the graphical menu.

Figure 5:
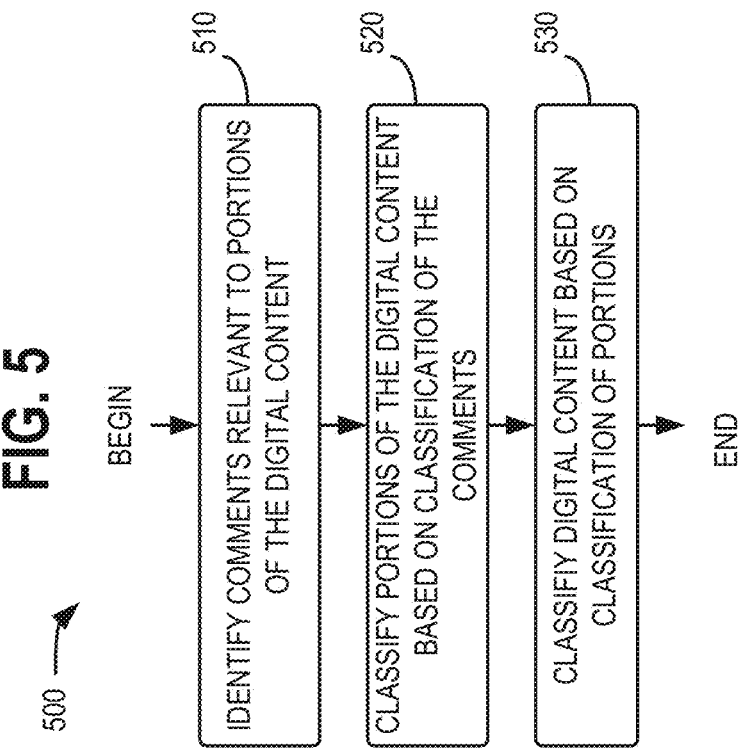
FIG. 5 shows a flow diagram of an exemplary process for classifying digital content based on classifying portions of the digital content.

FIG. 5 is a flow diagram of an exemplary process 500 for classifying digital content in block 440 based on classifying portions of the digital content. In one implementation, process 500 may be performed by classification device 240. In other implementations, process 500 may be performed using classification device 240 and one or more other devices.

Process 500 may include identifying comments associated with portions of the digital content (block 510). For example, as described with respect to comments table 700, time field 720 may store information identifying times associated with the comments 124 and 126, and classification device may use the information in time field 720 to identify portions of the digital content associated with comments 124 and 126. For example, classification device 240 may determine portions of the digital content associated with the times stored in time field 720. For example, classification device 240 may interface with content device 220 to identify a portion of the digital content being streamed (or otherwise provided) to client device 210 at the times stored in time field 720.

In another implementation, classification device 240 may analyze contents of a comment to determine whether the comment relates to a particular portion of the digital content. For example, classification device 240 may determine whether the comment includes language that references a portion of the digital content (e.g., "beginning," "introduction," "middle," "ending," refrain," "chorus," etc.).

Continuing with FIG. 5, process 500 may include classifying portions of the digital content based on classification of the comments associated with the portions (block 520). As described above with respect to blocks 420 and 430, classification device 240 may classify a comment (e.g., associate the comment with a particular classification) based on parsing the comment and identifying one or more terms in the comment associated with the classification.

In block 520, classification device 240 may identify a number of comments (i.e., a "classification count") about a portion of the digital content that include terms associated with a particular classification and may determine whether to associate the portion of the digital content with the particular classification based on the classification count. For example, classification device 240 may associate the portion of the digital content with the particular classification if the classification count exceeds a threshold value. For example, classification device 240 may associate the portion of the digital content with the particular classification if at least a half (or other fraction) and/or a particular quantity of comments for the portion of the digital content are associated with the particular classification. In addition or alternatively, classification device 240 may associate the portion of the digital content with the particular classification if the classification count associated with the particular classification exceeds the classification counts associated with other classifications. If the classification counts for multiple classifications exceed the threshold value, classification device 240 may associate the portion of the digital content with the multiple classifications.

Continuing with FIG. 5, process 500 may include classifying the digital content based on classifying the portions of the digital content (block 530). Classification device 240 may associate the digital content with a particular classification if at least a threshold number of portions of the digital content are associated with the particular classification. For example, classification device 240 may associate the digital content with the particular classification if at least a half (or other fraction) and/or a particular quantity of the portions of the digital content are associated with the particular classification. If at least threshold number of portions of the digital content is associated with multiple classifications, classification device 240 may associate the portion of the digital content with the multiple classifications. In addition or alternatively, classification device 240 may associate the digital content with the particular classification if the number of portions of the digital content associated with the particular classification exceeds the number of portions of the digital content associated with other classifications.

In one implementation, classification device 240 may generate a graphical classification of the digital content during block 530. For example, as shown in FIG. 1, classification device 240 may generate a graphical classification 134 that shows the number (or counts) of comments in different classifications at different times (e.g., different portions of the digital content). In the exemplary graphical classification 134 shown in FIG. 1, a portion of the digital content associated with $T_1$ is classified as "Romance" since a relatively larger number of "Romance" comments were received for this portion of the digital content, and a portion of the digital content associated with $T_2$ is classified as "Action" since a relatively larger number of "Action" comments were received for this portion of the digital content. In this manner, classification device 240 may generate an overall plot of the content with more granular classifications that just a single classification or genre.

Graphical classification 134 may be generated in block 530 based on multiple comments received from the user. In addition or alternatively, graphical classification 134 may be generated by statistically analyzing comments associated with portions of the digital content to generate a curve associated with graphical classification 134. For example, curve fitting and/or regressions analysis techniques may be used to construct a curve, or mathematical function, that has the best fit to a series of data points associated with the comments. Curve fitting may include, for example, performing interpolation to connect the data points, smoothing to construct a curve that best fits the data points, and/or extrapolation to determine a fitted curve beyond the range of the observed data (e.g., estimating preferences levels associated with portions of the digital content in which the user did not submit comments).

Containing with process 400 in FIG. 4, data associated with the classification of the digital content may be presented (block 450). For example, as shown in FIG. 1 classification 132 and/or graphical classification 134 may be presented in interface 100.

In one implementation, advertisement data may be selected and provided to the user based on the classification of the digital content. In addition or alternatively, the advertisements may be selectively presented during portions of the digital content based on the classification. In the example presented in graphical classification 134 of FIG. 1, certain advertisements may be selected to be shown during the end portion (e.g., associated with $T_2$) based on this portion of the digital content being classified in the "action" classification. In another implementation, the classification of the digital contents, as determined in process 400 and/or 500 may be used to identify other digital content to recommend to the user.

FIG. 6 is a flow diagram of an exemplary process 600 for recommending other digital content based on classifying the digital content. In one implementation, process 600 may be performed by classification device 240. In other implementations, process 600 may be performed using classification device 240 and one or more other devices.

Process 600 may include determining the user's opinion regarding particular digital content (block 610). For example, classification device 240 may parse terms included in comments associated with the particular digital contents, and determine the user's opinion about the particular digital contents based on the parsed terms. For example, classification device 240 may determine whether a comment includes a positive term indicating an approval of the particular digital contents or a negative term indicating a dislike of the particular digital contents. Classification device 240 may also further infer a user's preference based on the user's actions (e.g., inferring that the user liked the digital content when the user ordered and/or watched the entire or only a portion of the digital content).

In another implementation, classification device 240 may identify the user's preferences regarding one or more portions of the particular digital content. For example, classification device 240 may parse terms included in comments associated with a portion of the particular digital contents, and determine the user's opinion about the portion contents based on the parsed terms. Classification device 240 may further identify the user's preferences based on the user's action with respect to the portion of the digital content. For example, classification device 240 may infer that a user disliked a portion of the digital content if the user skipped the portion.

Continuing with FIG. 6, process 600 may include comparing the classification of the particular digital content (or portion of the particular digital content) to the classification of other digital contents (block 620). For example, classification device 240 may identify digital content of similar and/or different classifications.

In one implementation, classification device 240 may compare the classifications of portions of the digital content to the classifications of corresponding portions of the other digital content. In the example of graphical classification 134 in FIG. 1 (in which the first portion of the digital content is in the romance classification and the second portion of the digital content is in the action classification), classification device 240 may identify another digital content that includes romance and action portions. For example, using graphical classification 134 as a general plot indicator, classification device 240 may identify other digital content with similar plots.

Continuing with FIG. 6, process 600 may include identifying another digital content based on the comparison of the classifications (block 630). For example, if classification device 240 determines that the user liked a digital content (or a portion of the digital content) in block 610, classification device 240 may identified another digital content identified in block 620 that has a similar classification. Alternatively, if classification device 240 determines that the user disliked a digital content (or a portion of the digital content) in block 610, classification device 240 may identified another digital content identified in block 620 as having a different classification.

In one implementation, if no other digital contents are associated with an identical classification, classification device may identify another digital content with similar classification(s). For example, if a "liked" digital content is associated with a particular classification, classification device 240 may identify another digital with at least one portion associated with the particular classification.

In block 630, if multiple other digital contents (i.e., "candidate digital contents") have the same particular classification as the liked digital content, classification device 240 may rank the candidate digital contents and select the recommended digital content based on the ranking. For example, classification device 240 may rank the candidate digital contents based on the number or percentage of portions of the candidate digital contents associated with the particular classification.

In another implementation, candidate digital contents may be ranked based on additional factors. For example, a user may submit selection criteria (e.g., via interface 100), and the candidate digital contents may be further ranked based on their relative relevance to the selection criteria. For example, if a user submits selection criteria identifying a particular performer, the candidate digital contents may be further weighted and ranked based on whether the performer appears within the candidate digital contents.

Candidate digital contents may also be ranked in block 630 also based on relationships between a user submitting comments and another user receiving the recommendation. For example, a user may define a relationship with another user, and the ranking of candidate digital contents associated with the other user may be adjusted based on the relationship. For example, a user may manually designate another user as a reliable source whose recommendations should be boosted in the rankings, or as an unreliable source whose recommendations should be lowered in the rankings. Classification devices 240 may also determine the relationships between the users dynamically. For example, the ranking of candidate digital contents positively commented upon by another user that is an acquaintance (e.g., connected to the user via social media, included as a stored contact, etc.) may be boosted relative to other candidate digital contents associated with another user who is not an acquaintance.

In another implementation, candidate digital contents may be ranked in block 630 further based on demographic information or other information associated with the commenting users. For example, if classification device 240 is generating a recommendation for a user in a certain age group and living in a particular geographic region, candidate digital contents associated with other users in the age group and the particular geographic region may be ranked higher than other candidate digital contents associated users in other age groups and/or other geographic regions. In another example, a topic of interest associated with the user may be determined (e.g., based on the user's prior purchases of digital content), and the candidate digital contents may be ranked such that digital content associated with the topic of interest are ranked higher relative to other candidate digital contents.

In another implementation, classification device 240 may rank the candidate digital contents in block 630 further based on other factors. For example, if a service provider is promoting a particular digital content (e.g., digital content from a particular content provider), classification device 240 may rank the promoted digital content higher relative to other candidate digital contents.

An example summarizing sample comments received for a digital content is shown in table 900 in FIG. 9. For example, table 900 may include a time period field 910 identifying 32 different time periods (or portions) of the digital content and a total counts field 920 identifying a number of comment (or counts) received during each of the timer periods identified in time period field 910. The values in time period field 910 may correspond to a fixed amount of time portions of the digital content. In the example of FIG. 9, 32 separate time periods are shown in time period, and this may correspond, for example, to 32 three-minute (or other duration) portions of a 96 minute movie. In another implementation, the values in time period field 910 may correspond to logical partitions of the digital content, such as chapters in an electronic book or scenes in a movie.

FIG. 10A shows a graph 1010-A that presents a total number (or count) of comments 1020 received for different time period 1030. The total numbers of comments 1020 per time period 1030 correspond to the values in time period field 910 and total counts field 920. Graph 1010-A shows that some time periods 1030 receive more comments that other time periods. For example, more comments (26) are received during time period 15 than other time periods.

When the total number of comments 1020 is relatively large (e.g., a largest total number of comments 1020 during a range of time periods 1030, a total number of comments 1020 that is greater than a threshold value, or a total number of counts (or comments) 1020 that is greater than an average of the total numbers of comments 1020 during a range of time periods 1030), the corresponding time period 1030 may correspond to a relatively important and/or interesting portion of the digital content. For example, a portion of a movie receiving a large amount of comments 1020 (time period 15) may correspond to a note worthy part of the movie (e.g., the climax). In another implementation, a range of time periods 1030 (e.g., two or more continuous time periods 1030) associated with relatively large total numbers of counts 1020 is identified.

In one implementation, the part of the digital content (e.g., a corresponding time period 1030 or a range of time periods 1030) associated with a relatively large number of comments may be used to summarize the digital content. For example, time period 1030 of the digital content, corresponding to a large number of comments 1020, may be used in a preview of and/or advertisement for the digital content.

Continuing with FIG. 9, table 900 may further include separate counts (e.g., a number of comments) associated with separate classification for the digital content. In the example of FIG. 9, table 900 may include comedy counts 920, boring counts 930, sad counts 940, and action counts 950 identifying numbers of comments received in comedy, boring, sad, and action classifications during the time values in time period field 910.

FIG. 10B shows a graph 1010-B that demonstrates counts (or comments) 1020 associated with different classifications during different time periods 1030. Specifically, counts graph 1010-B may include separate comedy graph 1040-A, boring graph 1040-B, sad graph 1040-C, and action graph 1040-D. Comedy graph 1040-A, boring graph 1040-B, sad graph 1040-C, and action graph 1040-D graphically depict a number of counts 1020 associated with each of the comedy, boring, sad, and action classifications during the time periods 1030.

In the example of FIGS. 9 and 10B, the corresponding digital content may be associated with the "action" classification since more "action" comments are received than comments in the other classifications and/or may be associated with the "sad" classification since the "sad" comments are associated with the longest duration (e.g., time periods 18-27).

In additional or alternatively, during each of the time periods 1030, corresponding portion of the digital content may be associated with a classification having a largest counts (or number of comments). In the example of table 900 in FIG. 9 and as depicted in FIG. 10B, the digital content may be classified as "comedy" during time periods 1-8; as "boring" during time periods 8-13 and 29; as "sad" during time periods 13-18; and as "action" during time periods 18-27.

In another implementation, different times (or portions) 1030 of the digital content may be classified into different classifications when the counts of comments associated with the classifications exceed a threshold. For example, if the threshold value is three (3) counts, time period 6 of the digital content may be classified as both a "comedy" and "boring;" and the digital content may be classified as both "boring" and "sad" during time periods 14 and 15.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   storing, by a processor, information associating terms with categories;
   receiving, by the processor, comments associated with a digital content, wherein the comments are received from one or more users during a plurality of time periods associated with portions of the digital content;
   determining, by the processor, classifications of the comments, and wherein determining a classification of one of the comments includes:
     parsing the comment to determine one or more terms included in the comment, and
     determining the classification associated with the comment based on the one or more terms;
   determining, by the processor, a graphical classification of the digital content based on the classifications associated with the comments, wherein the graphical classification identifies a quantity of the comments in the classifications received during each of the plurality of time periods, and wherein determining the graphical classification of the digital content further includes:
     identifying data points that correspond to the quantity of the comments in the classifications received during each of the plurality of time periods;
     performing interpolation to generate a graphical curve that connects the data points; and
     performing extrapolation to fit the graphical curve to one or more of the plurality of time periods during which comments were not received; and
   presenting, by the processor, the graphical classification for display.

2. The method of claim 1, wherein determining the graphical classification of the digital content includes:
   determining the portions of the digital content associated with the comments;
   determining the classifications of the portions of the digital content based on the classifications of the comments; and
   determining at least one classification of the digital content based on the classifications of the portions.

3. The method of claim 2, wherein determining the portions of the digital content associated with the comments includes:
   determining one or more of the portions of the digital content being presented to the one or more users when the comments are received.

4. The method of claim 2, wherein determining the classifications of the portions of the digital content includes:
   identifying a subset of the comments associated with a portion of the digital content; and
   identifying a particular classification, of the classifications, associated with at least a threshold number of the subset of the comments, wherein the classification of the portion corresponds to the particular classification.

5. The method of claim 1, wherein determining the graphical classification of the digital content based on the classifications associated with the comments includes:
   identifying a particular classification, of the classifications, associated with at least a threshold number of the comments, wherein the graphical classification of the digital content corresponds to the particular classification.

6. The method of claim 1, further comprising:
   identifying one or more advertisements based on the graphical classification of the digital content, wherein the one or more advertisements are provided for presentation with the digital content.

7. The method of claim 1, wherein determining the graphical classification of the digital content comprises:
   determining a plurality of graphical classifications, wherein the plurality of graphical classifications identify respective quantities of the comments in the classifications received during each of the time periods, and
   wherein presenting the graphical classification includes presenting the plurality of graphical classifications.

8. A device comprising:
   a memory configured to store information associating terms with categories; and
   a processor configured to:
     identify comments associated with digital content, wherein the comments are submitted by one or more users during a plurality of time periods associated with portions of the digital content;
     parse the comments to identify one or more terms included in the comments;
     determine the respective classifications associated with the comments based on the one or more terms;
     determine a graphical classification of the digital content based on the classifications associated with the comments, wherein the graphical classification identifies a quantity of the comments in the classifications received during each of the time periods, and wherein, when determining the graphical classification of the digital content, the processor is further configured to:
       identify data points that correspond to the quantity of the comments in the classifications received during each of the time periods;
       perform interpolation to generate a graphical curve that connects the data points; and
       perform extrapolation to fit the graphical curve to one or more of the time periods during which comments were not received; and
     present the graphical classification for display.

9. The device of claim 8, wherein the processor, when determining the graphical classification of the digital content, is further configured to:
   determine the portions of the digital content associated with the comments;
   determine the classifications of the portions of the digital content based on the classifications of the comments; and
   determine at least one classification of the digital content based on the classifications of the portions.

10. The device of claim 9, wherein the processor, when determining the classifications of the portions of the digital content, is further configured to:
    identify a subset of the comments associated with one of the portions of the digital content; and
    identify a particular classification, of the classifications, associated with at least a threshold number of the subset of the comments, wherein a classification of the one of the portions corresponds to the particular classification.

11. The device of claim 9, wherein the processor is further configured to:

identify one of the portions associated with at least a threshold number of the comments; and
automatically provide the portion for display during a preview of the digital content.

12. The device of claim 8, wherein the processor is further configured to:
    identify a particular classification, of the classifications, associated with at least a threshold number of the comments; and
    determine a classification for the digital content based on the particular classification.

13. The device of claim 8, wherein the graphical classification further identifies, based on the quantity of comments received during each of the time periods, ones of the classifications associated with the portions of the digital content, and wherein the processor is further configured to:
    identify another digital content for recommendation to a user of the one or more users, wherein the other digital content corresponds to the ones of the classifications associated with the portions of the digital content.

14. The device of claim 8, wherein the processor, when determining the graphical classification of the digital content, is further configured to:
    determine a plurality of graphical classifications, wherein the plurality of graphical classifications identify respective quantities of the comments in the classifications received during each of the time periods, and
    wherein the processor, when presenting the graphical classification, is further configured to present the plurality of graphical classifications.

15. A non-transitory computer-readable medium to store instructions comprising:
    one or more instructions that, when executed by a processor, cause the processor to:
        identify comments associated with digital content, wherein the comments are submitted by one or more users during a plurality of time periods associated with portions of the digital content;
        parse the comments to identify one or more terms included in the comments;
        determine the classifications associated with the comments based on the one or more terms;
        identify a graphical classification of the digital content based on the classifications associated with the comments, wherein the graphical classification identifies a quantity of the comments in the classifications received during each of the time periods, and wherein the one or more instructions that cause the processor to identify the graphical classification of the digital content further include one or more instructions that cause the processor to:
            identify data points that correspond to the quantity of the comments in the classifications received during each of the time periods;
            perform interpolation to generate a graphical curve that connects the data points; and
            perform extrapolation to fit the graphical curve to one or more of the time periods during which comments were not received; and
        present the graphical classification for display.

16. The non-transitory computer-readable medium of claim 15, wherein the one or more instructions that cause the processor to identify the graphical classification further include:
    one or more instructions that cause the processor to:
        determine the classifications of the portions of the digital content based on the classifications of the comments; and
        identify the graphical classification based on the classifications of the portions.

17. The non-transitory computer-readable medium of claim 16, wherein the one or more instructions that cause the processor to determine the classifications of the portions of the digital content further include:
    one or more instructions that cause the processor to:
        identify a subset of the comments associated with one of the portions of the digital content; and
        identify a particular classification, of the classifications, associated with at least a threshold number of the subset of the comments, wherein a classification of the one of the portions corresponds to the particular classification.

18. The non-transitory computer-readable medium of claim 15, wherein the one or more instructions that cause the processor to identify the graphical classification of further include:
    one or more instructions that cause the processor to:
        identify a particular classification, of the classifications, associated with at least a threshold number of the comments during each of the time periods.

19. The non-transitory computer-readable medium of claim 15, wherein the one or more instructions that cause the processor to identify the comments further include:
    one or more instructions that cause the processor to:
        provide an interface for presentation to a user of the one or more users; and
        receive a comment from the user via the interface.

20. The non-transitory computer-readable medium of claim 15, wherein the one or more instructions that cause the processor to identify the comments further include:
    one or more instruction that cause the processor to obtain the comments from a social media website.

* * * * *